(No Model.)
G. H. BENJAMIN.
EXPANSION JOINT.
No. 373,432. Patented Nov. 22, 1887.
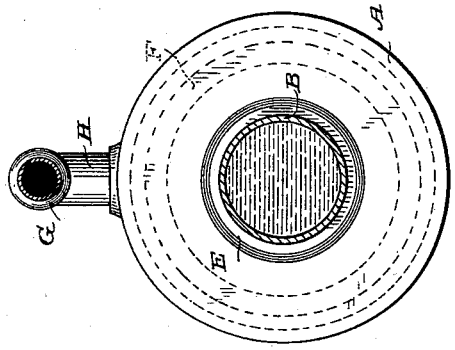
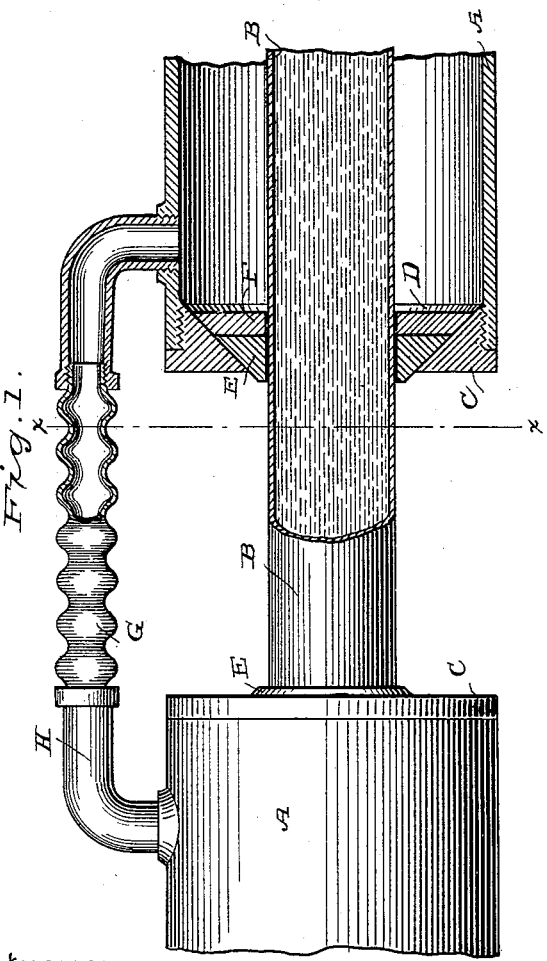
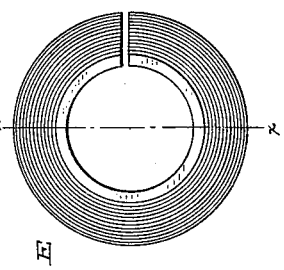
Witnesses
H. A. Lamb.
Rob't C. Hine
Inventor
Geo. H. Benjamin

UNITED STATES PATENT OFFICE.

GEORGE H. BENJAMIN, OF NEW YORK, N. Y.

EXPANSION-JOINT.

SPECIFICATION forming part of Letters Patent No. 373,432, dated November 22, 1887.

Application filed April 1, 1887. Serial No. 233,339. (No model.)

*To all whom it may concern:*

Be it known that I, GEORGE H. BENJAMIN, of the city, county, and State of New York, have invented certain new and useful Improvements in Expansion-Joints, of which the following is a specification.

My invention relates to improvements in expansion-joints for pipes conveying gases or fluids of varying temperatures, or between pipes conveying different bodies and having different rates of expansion and contraction.

My invention further relates to the combination, with such a joint and the packed pipes, of an expansible connecting-pipe.

In the accompanying drawings, which illustrate my invention, similar letters of reference indicate like parts.

Figure 1 is a view, partially in elevation and partially in longitudinal vertical section, of the ends of two pipes containing a pipe of smaller diameter, and shows the expansion-joint and the corrugated pipe connecting the pipe-sections. Fig. 2 is an end view and section on the line X X of Fig. 1. Fig. 3 is a plan view of one of the divided metallic packing-rings. Fig. 4 is a vertical section of a ring on the line X X of Fig. 3. Fig. 5 is a similar view of a split ring.

A A are seamless or other pipes, such as are suitable for conveying steam or other similar body, and B is a like pipe of relatively smaller diameter contained within the pipes A, and in the present instance shown as conveying a liquid.

Screwed into or on the end of the pipes A are the end pieces or gaskets, C, provided on their inner faces with the cone-shaped seats D, on and within which are the conical metallic divided or split rings E F, which conform in shape to that of the seat and have their inner diameter slightly larger than the pipe B, which they surround. The ring may be divided, Figs. 3 and 4, or split, as at Fig. 5. In the seat I prefer to use two rings, so as to break joints at the divided or split portions of the rings.

G represents a corrugated metal pipe suitably fastened to the elbow-pipes H, connected to the pipes A.

The pipe G may be so made as to allow considerable longitudinal expansion. The operation of the joint will be readily understood.

The steam or body in pipes A impinges upon the base of rings E F, driving them along the seat, and thereby contracting their diameter upon the pipe B.

If the pipes A A be fastened at their farther end, any expansion will cause the pipes to approach each other, the pipe B entering farther into the pipe A A and the corrugated pipe G compressed upon itself between the elbows H. The joint will accommodate itself to any movement of the pipes by reason of variations in temperature, and yet remain steam-tight.

I do not limit myself to the particular construction shown, as it will be evident that many modifications may be made without departing from the intent of my invention.

I claim as my invention—

1. In combination with two pipes of different diameter, two or more divided metallic packing rings surrounding the pipe of smaller diameter and a packing seat for said rings in the pipe of largest diameter.

2. In combination with two pipes of different diameter, a metallic packing between said pipes, consisting of conical rings, split or divided, and adapted to be packed by the pressure of the body in the larger of the pipes.

3. In combination with two pipes of different diameter, a removable plate or gasket attached to the larger pipe and provided with a packing-seat, and two or more packing-rings within said seat and surrounding the smaller pipe, as described.

4. In combination with two pipes of the same diameter and a pipe within said pipes of relatively smaller diameter, two sets of metallic packing-rings, packing-seats therefor, and a corrugated pipe connecting the pipes of the same diameter, substantially as and for the purpose set forth.

5. In combination with two pipes, a pipe within said pipes of relatively smaller diameter, two sets of metallic packing-rings, and packing-seats therefor, all substantially as and for the purpose set forth.

In witness hereunto I set my hand on this the 15th day of March, 1887.

GEO. H. BENJAMIN.

Witnesses:
 ROBT. C. HINE,
 DANIEL G. THOMPSON.